Patented Jan. 16, 1934

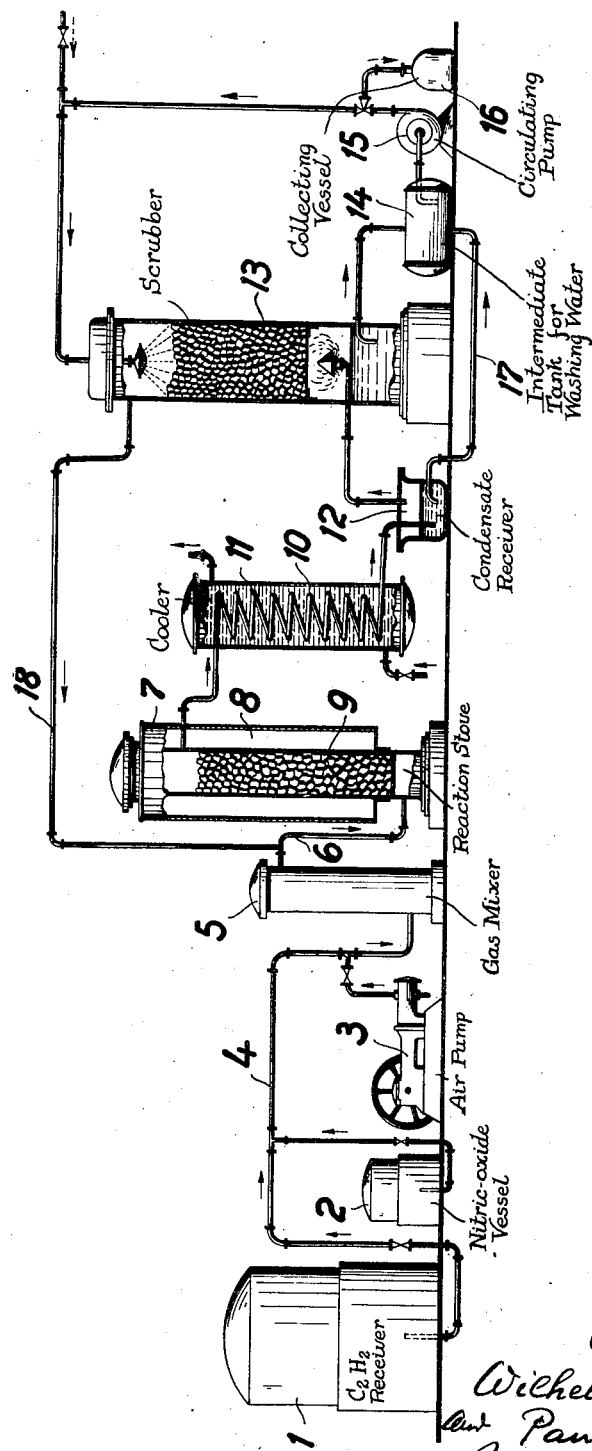

1,943,385

UNITED STATES PATENT OFFICE 1,943,385

PROCESS FOR PRODUCTION OF OXIDATION PRODUCTS OF ACETYLENE

Wilhelm Heckel and Paul Nashan, Oberhausen-Rheinland, Germany, assignors to the firm Gutehoffnungshutte Oberhausen Aktiengesellschaft, Oberhausen-Rheinland, Germany Application July 27, 1931, Serial No. 553,352, and in Germany August 2, 1930

3 Claims. (Cl. 260—116)

Our invention relates to a process of producing acetic acid and acetaldehyde from acetylene.

The conversion of acetylene into its oxidation products, more particularly acetic acid, has already been attempted in various ways. In these prior attempts the reactions were essentially carried out in the liquid state, preferably in presence of mercury salts, the action of which was assisted, if desired, by other contact substances, for example, iron, copper, or oxides thereof, alkali sulphate. Acetaldehyde has also been obtained by leading a gas mixture containing acetylene together with steam over solid catalysts containing phosphoric acid or boric acid.

The new process described below avoids the addition of steam and the necessity of having solid catalysts present for carrying out the reaction. Acetaldehyde and acetic acid are successfully produced directly from an acetylene-oxygen or air mixture by adding nitric oxides to the same as catalysts before or on entry into the reaction chamber. The presence of even small quantities of nitric oxides, for example, less than 1% by volume referred to the total gas mixture, expedites the oxidation process to a considerable extent. Thus, for example, about 25-30% of the acetylene can be successfully converted into oxidation products without difficulty by a single passage through the reaction furnace at temperatures which are maintained below the ignition point of the gas mixture coming into question.

The use of a gaseous catalyst affords the further advantage that special reaction chambers for the arrangement of solid catalysts can be dispensed with and that such catalysts permit of a more intimate and lasting contact with the reacting gases. The nitric oxides change their valences inside the reaction chamber in the course of their action, so that they will be present in the form of monoxides, dioxides, trioxides, and so forth, are separated at the end of the reaction and may be added again to the reaction mixture.

It has also been found to be advantageous to dilute the acetylene-oxygen or air mixture with carbonic acid or some other gas which does not accelerate the combustion process.

Examples of process 1. 80 litres of acetylene and 250 litres of air to which 0.4% of NO have been admixed, were conducted per hour at a temperature of 287° C. through a quartz tube heated from the exterior and filled with quartz fragments. 54 gr. of acetic acid and 100 gr. of acetaldehyde were found in the washing water for each cbm. of acetylene. If 3% hydrogen peroxide solution was used as washing liquid then immediate oxidation to acetic acid took place and 185 gr. of acetic acid were obtained per cbm. of acetylene.

2. 80 litres per hour of acetylene and 300 litres per hour of air, mixed with 0.45 vol.-% of NO, were passed at 319° C. through the same quartz tube. In the 3% hydrogen peroxide solution there were 190 gr. of acetic acid per cbm. of acetylene.

3. 60 litres of acetylene, 20 litres of carbonic acid, 300 litres of air and in addition 0.5 vol.-% NO, were conducted per hour at 407° C. through a wide porcelain tube filled with very narrow little tubes of porcelain. Besides 104 gr. of acetic acid 138 gr. of acetaldehyde were found in the washing water per cbm. of acetylene: the acetaldehyde was readily oxidized by addition of weak hydrogen peroxide solution.

4. As a blank test the same quantity of the gas mixture mentioned in Example 3, but without addition of nitric oxides was passed through the same reaction tube under the same temperature conditions. In the washing water acid was found corresponding to 3.0 ccm. of N/1 NaOH, i. e. 3 gm. of acid calculated as acetic acid.

In Examples 1 to 3 nitric oxide was used for an accurate addition of a catalyst, since this can be accurately handled volumetrically. The reaction, however, also succeeds with nitric oxides of other valency, as these also appear in the course of the reaction.

The accompanying drawing shows schematically a plant as an illustration for technically carrying out the process according to our invention. The gas container 1 contains the acetylene or a gas containing acetylene. The gas container 2 contains the nitric oxides and the pump 3, or a gas container not shown, yields the necessary oxygen or the gases containing oxygen, e. g. air. Acetylene and oxygen, or the gases containing these constituents, are conducted through the pipe 4 preferably to the mixer 5 for the purpose of intimate admixture of the reaction mixture, the nitric oxides, as shown, being added to the reaction constituents prior to the mixer or just after the mixer. The gases pass from the mixer through a pipe 6 into the reaction vessel 7 in which they are brought to the correct reaction temperature, either electrically or by any other means as by a heating appliance provided in the heating space 8. In particular it is also possible in the case of electrical heating to provide for interior heating of the reaction space. The reaction space is preferably filled with material 9 which distributes heat and which does not accelerate combustion and ignition, for which purpose diluting gases, e. g. carbonic acid, may also be employed.

In the reaction vessel 7 the oxidation of the acetylene to acetaldehyde and acetic acid takes place in the presence of the nitric oxides; the acetaldehyde and acetic acid are then cooled down in the cooler 10 by means of the cooling coil 11 as a result of which a portion of the reaction products is already precipitated and separated out in the receiver 12. The gases and vapours still present are washed in the washer 13, the reaction products being led to a collecting vessel 14 and being supplied again by means of a pump 15 to the washer 13 until they possess the desired concentration, after which they are drawn off into a transport vessel 16. A connecting pipe 17 between the receiver 12 and the collecting vessel enables the products which have separated out in the receiver 12 to pass into the collecting vessel 14. The unchanged residual gases and nitric oxides may be added to the starting substances again by way of the pipe 18 either before or after the mixer 5, or they may be utilized in some other way, e. g. by being further treated up in a similar plant.

What we claim is:

1. The process of producing acetic acid and acetaldehyde from acetylene, which consists in mixing acetylene with free oxygen containing gases, adding to said mixture small quantities of nitric oxides, intimately mixing all the constituents, and heating the mixture to the required temperature so as to cause the oxidation of the acetylene to acetic acid and acetaldehyde.

2. The process as specified in claim 1, which includes adding to the mixture of acetylene and free oxygen containing gases diluting gases which do not promote combustion.

3. The process as specified in claim 1, which includes cooling the reaction product and then separating it from the residual gases.

WILHELM HECKEL.
PAUL NASHAN.